United States Patent [19]
Bahler

[11] Patent Number: 5,271,088
[45] Date of Patent: Dec. 14, 1993

[54] AUTOMATED SORTING OF VOICE MESSAGES THROUGH SPEAKER SPOTTING

[75] Inventor: Lawrence G. Bahler, San Diego, Calif.

[73] Assignee: ITT Corporation, New York, N.Y.

[21] Appl. No.: 44,546

[22] Filed: Apr. 7, 1993

Related U.S. Application Data

[63] Continuation of Ser. No. 922,139, Jul. 30, 1992, abandoned, which is a continuation of Ser. No. 699,217, May 13, 1991, abandoned.

[51] Int. Cl.$^5$ .............................................. G10L 5/06
[52] U.S. Cl. ..................................................... 395/2
[58] Field of Search ......................... 395/2; 381/41–43

[56] References Cited

U.S. PATENT DOCUMENTS

| | | | |
|---|---|---|---|
| 3,700,815 | 10/1972 | Doddington et al. | 395/2 |
| 3,816,722 | 6/1974 | Sakoe et al. | 395/2 |
| 4,100,370 | 7/1978 | Suzuki et al. | 395/2 |
| 4,601,054 | 7/1986 | Watari et al. | 395/2 |
| 4,694,493 | 9/1987 | Sakoe | 381/42 |
| 4,716,593 | 12/1987 | Hirai et al. | 395/2 |
| 4,837,804 | 6/1989 | Akita | 395/2 |
| 4,910,782 | 3/1990 | Watari | 381/42 |

Primary Examiner—David D. Knepper
Attorney, Agent, or Firm—Arthur L. Plevy; Patrick M. Hogan

[57] ABSTRACT

A speaker recognition apparatus employs a non-parametric baseline algorithm for speaker recognition which characterizes a given speaker's speech patterns by a set of speech feature vectors, and generates match scores which are sums of a ScoreA set equal to the average of the minimum Euclidean squared distance between the unknown speech frame and all reference frames of a given speaker over all frames of the unknown input, and ScoreB set equal to the average of the minimum Euclidean squared distance between each frame of the reference set to all frames of the unknown input. The performance on a queue of talkers is further improved by normalization of reference message match distances. The improved baseline algorithm addresses the co-channel problem of speaker spotting when plural speech signals are intermixed on the same channel by using a union of reference sets for pairs of speakers as the reference set for a co-channel signal, and/or by conversational state modelling.

8 Claims, 4 Drawing Sheets (INTER-MESSAGE MATCHING PROCESS)

(BASELINE ALGORITHM PERFORMANCE)

(ROC FOR SIMULATED CO-CHANNEL REGIME)

AUTOMATED SORTING OF VOICE MESSAGES THROUGH SPEAKER SPOTTING

This is a continuation of application Ser. No. 07/922,139, filed on Jul. 30, 1992, which is a continuation of application Ser. No. 07/699,217, filed on May 13, 1991, now abandoned.

FIELD OF THE INVENTION

The present invention relates to automated speaker spotting, and particularly, to a system for automated sorting of voice messages through speaker recognition using improved recognition processing techniques.

BACKGROUND OF THE INVENTION

Automatic algorithms for speaker recognition have been developed as early as 1963. In one early study by S. Pruzansky, described in "Pattern-Matching Procedure For Automatic Talker Recognition", *J. Acoust. Soc. Amer.*, vol. 35, pp. 354–358, 1963, the information contained in digital spectrograms of words excerpted from sentences was used as the feature set in comparing utterances of different speakers. In a further study on the same data, a methodology was proposed for selecting features formed by averaging the speech energy within rectangular areas of the spectrograms of selected words. The general conclusion was that the effectiveness of such features is reduced by averaging across frequency and increased by averaging across time. Despite the counterintuitive nature of these findings, the merit of long-term averaging was confirmed in a more recent and much larger study by S. Furui, "Comparison Of Speaker Recognition Methods Using Statistical Features And Dynamic Features", *IEEE Trans. ASSP*, vol. 29, pp. 342–350, June 1981.

In 1974, studies investigated the use of linear predictive parameters as features for speaker recognition. This work was motivated by the observation that the predictor coefficients, together with pitch and voicing, were sufficient to regenerate high-quality synthetic speech. A minimum distance rule was used for recognition and the inference vectors were long-term time averages of the various linear predictive parameters. Cepstral coefficients were found to give the best accuracy. On clean speech, speaker recognition methods based on linear prediction were shown in one study by R. E. Wohlford, E. H. Wrench, and B. P. Landell, "A Comparison Of Four Techniques For Automatic Speaker Recognition", *Proc. IEEE ICASSP*, no. 3, pp. 908–911, 1980, to outperform methods based on power spectral or cepstral analysis. This work was done on studio-quality speech, and more recent work indicates that this conclusion does not hold for telephone speech. A difficulty in applying linear predictive analysis to telephone speech is that such analysis is highly sensitive to narrow-bandwidth signals (tones), even when they are of very low amplitude.

In 1985, studies by P. Rajasekaran and G. Doddington, "Speech Recognition In The F-16 Cockpit Using Principal Spectral Components", *Proc. ICASSP-85*, vol. 2. p. 882, 1985, performed linear prediction analysis by the autocorrelation method. It then performs Fourier spectral analysis on the impulse response of the prediction filter, and computes a filterbank representation of the power spectral envelope. The principal spectral components method was later applied to speaker verification by J. Naik and G. Doddington, "Evaluation Of High Performance Speaker Verification System For Access Control", *Proc. ICASSP*, pp. 2392–2395, 1987. Improved accuracy was obtained by replacing the principal components transformation with a "clustering" transformation. Similar findings have been reported in other studies. The motivation of this approach is that it selects features based on their discrimination power rather than their variance.

A number of studies have been done to select a relatively small set of features that efficiently characterizes a speaker. In one study, it was found that the fundamental frequency parameters led all others in terms of discrimination ratio. This conclusion was shown to be invalid in a later study, which found practically no discrimination power in fundamental frequency. The later study showed the importance to speech data when appreciable time elapsed between the training and test samples. One study in the area of speech recognition by C. Olano, "An Investigation Of Spectral Match Statistics Using A Phonetically Marked Data Base", Proc. ICASSP-83, 1983, describes an evaluation procedure for developing a filterbank and match statistic to be used in a keyword recognition system.

In general, the research work in speaker recognition was focused at an early stage on developing "compact" and "efficient" measurements and models. A principal problem is how to handle extremely large numbers of statistics without exceeding the capabilities of speech processing machines, even despite the enormous increases in computer memory and processing capacity of machines today. In the long run, however, efforts to develop parsimonious representations may have only limited progress. Instead, a primary goal should be to improve performance, as opposed to reducing computation.

The early work in speaker recognition, such as that of Pruzansky discussed above, represented speakers as points in a multi-dimensional measurement space. New speech material to be recognized was processed to form another point in this same space. Recognition was performed by determining the distance to each speaker, and selecting the speaker with the minimum distance. A significant variation of the minimum-distance approach was reported by K. P. Li and E. H. Wrench, "An Approach To Text-Independent Speaker Recognition With Short Utterances", *Proc. IEEE ICASSP*, pp. 262–265, April 1983. Each speaker was modeled as a set of 40 points in the measurement space. These 40 points were frames from the speaker's training material that were chosen based on histograms of their distances to other training frames of the same speaker and different speakers. The system used a multi-modal, rather than a uni-modal, speaker model, minimized the effect of speech events not observed in the training data, and chose each speaker's model to discriminate that speaker from other speakers.

A similar method developed by F. Soong, A. Rosenberg, L. Rabiner, and B. Juang, "A Vector Quantization Approach To Speaker Recognition", Proc. ICASSP-85, Vol. 1, pp. 387–390; 1985, was based on vector quantization. A vector quantization codebook was created for each speaker from a clustering analysis of the training data. Test speech was then encoded using all codebooks, accumulating the coding distortion for each frame. The speaker whose codebook gave the lowest average distortion was recognized. A. L. Higgins and R. E. Wohlford, "A New Method Of Text Independent Speaker Recognition", Proc. ICASSP-86, vol. 2, no. 1, April 1986, developed a generalization of this method in which the individual frames in the codebook were replaced by multiple-frame segments. Recognition was performed by a template-matching algorithm, where the multiple-frame segments were used as templates. This method was compared with the vector quantization method and shown to give better text-independent speaker recognition accuracy.

The weaknesses of all these variants of minimum-distance multi-modal modeling are: (1) they require estimation of many free parameters, (2) the number of training examples associated with each mode is uncontrolled, and (3) the significance of deviations between the input speech and the modes is, unknown. The template-matching method is found to be quite sensitive to noise and other channel distortions.

The first use of statistical models in speaker recognition was reported in a study by A. B. Poritz, "Linear Predictive Hidden Markov Models And The Speech Signal", Proc. ICASSP-82, pp. 1291-1294, 1982. Speech production was modeled as an underlying, or hidden, Markov process in which outputs were generated with various probability density functions (PDFs) depending on the state of the model. Parameters of this hidden Markov model were assumed to be characteristic of the speaker.

In work by R. Schwartz, S. Roucos, and M. Berouti, statistical models were developed in which each speaker was characterized by a single multivariate PDF of individual frame feature vectors. They applied standard statistical pattern recognition procedures to estimation of PDFs and classification of speakers. In one method, each speaker's PDF was assumed to be multivariate Gaussian, and its parameters, the mean, and the covariance matrix, were estimated. The probability of each unknown frame was evaluated using this PDF, and the product of probabilities over all unknown frames was computed. The result was an estimate, assuming independent frames, of the likelihood of the observed unknown being produced by the model speaker.

Another method tested was a non-parametric PDF estimation technique. This technique computed the distance between each unknown frame and all the frames of training data for a given speaker. The likelihood of the frame was estimated using Parzen's method multiplied by a weighting factor. The Parzen estimate of the local density is inversely proportional to the volume of a hypersphere centered at the test point and just enclosing the kth-nearest training frame, where k is chosen depending on the total number of training frames. Again, the product of probabilities over all unknown frames was computed to produce an estimate, assuming independent frames, of the likelihood of the observed unknown being produced by the model speaker. The two probabilistic classifiers produced comparable recognition accuracy, which was clearly better than that of a minimum-distance method. However, it is found that the accuracy of Parzen estimates deteriorates rapidly as the dimensionality of the measurement space increases, so that the non-parametric is not found to be better than the parametric method.

Recently, R. Rose and D. Reynolds, "Text Independent Speaker Identification Using Automatic Acoustic Segmentation", Proc. ICASSP, pp. 293-296, 1990, reported development of a speaker identification algorithm based on parametric PDF estimation using a Gaussian mixture model. The density model is a weighted linear combination of Gaussian densities, each with a common diagonal covariance matrix. For a given number of component Gaussian densities, the algorithm estimates the weights, means, and variance terms using an unsupervised iterative maximum likelihood technique. The simulation results were excellent, outperforming the standard unimodal Gaussian model by a large margin.

Speaker verification was first tested using telephone channels in 1975 by A. B. Rosenberg, "Evaluation Of An Automatic Speaker-Verification System Over Telephone Lines", Bell System Tech. J., vol. 55, pp. 723-744, 1976. The system's initial rejection rates were about 20-25%, probably because enrollment was done in a single session. As the system was used, template adaptation reduced the error rate to a stable value of about 5%. A telephone line impairment that was observed to be definitely detrimental was pulse-like background noise. Such noises can be induced at the telephone exchange by switching currents in neighboring equipment. An excellent report on the signal degradations resulting from telephone transmission and their effects on speech recognition was written by L. S. Moye, in "Study Of The Effects On Speech Analysis Of The Types Of Degradation Occurring In Telephony", STL Monograph, pp. 1-238, Standard Telecommunication Laboratories, Harlow, England, July 1979.

H. Gish, et al., in "Methods And Experiments Of Text-Independent Speaker Recognition Over Telephone Channels", *Proc. ICASSP*-86, April 1986, reported on text-independent speaker recognition using the Gaussian modeling technique discussed above. When speaker testing data was taken from the same telephone call as their training data, accuracy in one test was 90%. When the same test was repeated using training and test data from different calls, accuracy decreased to 61%. About one-third of this loss was recovered through a combination of channel modeling, in which a correction factor was applied to the model covariance used in the mean term of the likelihood equation, and experimental adjustment of the weights assigned to the mean and covariance terms. Recently,, Gish developed a speaker identification method based on a metric for comparison of covariance matrices, described in "Robust Discrimination In Automatic Speaker Identification", *Proc. ICASSP*, pp. 289-292, 1990. Computationally, the metric involves a summation over a number of terms. Gish reports on the performance of a family of such metrics, which differ in the terms included in this summation. Excellent closed-set identification performance is shown for the best metric. There is, however, no way to determine a-priori which specific metric is best to use in a particular case. A further difficulty is that the method is a minimum-distance method, providing no information about the likelihood of the observations for a given speaker.

SUMMARY OF INVENTION

A principal feature of the present invention is the use of a baseline algorithm for speaker recognition which is non-parametric in nature and makes no assumption about the statistical distributions of speech features. The reference data used to characterize a given talker's speech patterns are a large set of speech feature vectors, not a set of estimated distribution parameters. By abandoning the use of assumed statistical models, i.e. the parametric approach, an order of magnitude improvement in speaker spotting performance can be obtained. Previous parametric models do not adequately represent the complexities of the true distribution of speech features. The further development of parametric methods, in the direction of more complicated distributions which might approximate true speech more accurately, have the difficulty of estimating an increased number of statistical parameters which such models entail. Although statistical models of speech may be developed in the future which are more accurate by virtue of a more suitable functional form, rather than by having more parametric degrees of freedom, it was appropriate to seek improvement in current speaker recognition systems by the non-parametric baseline algorithm of the present invention.

The non-parametric baseline algorithm is used in a speaker spotting system for the sorting of voice messages in telephone transmissions. The new algorithm achieves particularly promising results in speaker spotting in the co-channel mode of telephone transmission. The co-channel problem of speaker spotting, when two or more speech signals are intermixed on the same audio channel, is solved by using a simple union of reference data sets for pairs of talkers as the reference for a co-channel signal, and extending the score normalization procedures to sets of such models. This simple solution to the co-channel problem is made feasible by the power of the basic non-parametric algorithm in spotting speakers, and can be readily extended to telephone quality speech.

In accordance with the invention, non-parametric algorithms are developed for spotting the occurrences of known, "target" talkers within conversational telephone messages. The messages are sampled from a potentially open, population of talkers, and are made up of unrestricted extemporaneous speech. The algorithm will process messages in a message queue, producing a score for each message. The score is used to reorder the messages in the queue so that the messages containing "key" events are more likely to appear at the front of the queue than at the rear. The sorting algorithm is embedded in an integrated software system capable of accepting digitized waveform files as input. Rather than sorting voice models given an input message, the sorting algorithm attempts to sort input messages in search of a given voice. In both sorting tasks, pairings of voice models and input messages are to be ranked in order of the probability that the voice model matches the actual talker, given the acoustic observations. These probabilities cannot be directly estimated by comparing the input speech with the voice models. Rather, such a comparison provides a score related to the likelihood of the observations being produced by the model speaker. These two probabilities are related by Bayes rule.

$$p(S_o|X) = \frac{p(X|S_o)p(S_o)}{p(X)}$$

The denominator, p(X), is the probability of the input acoustic observation. In the case where voice models are being sorted given an input message, the denominator is constant, and the two probabilities are proportional. Thus, the likelihood of the observations with respect to the model is a sufficient statistic for the identification task. Where messages are being sorted, on the other hand, p(X) varies from one message to another, and must be estimated. This is a very important point that has not been addressed in previous work.

The algorithm of the present invention approximates p(X) as a sum of conditional probabilities of the message being produced by each individual talker in a set of reference talkers.

$$p(X) = \sum_{i=1}^{N} p(X|S_i)p(S_i)$$

In this approximation, the finite set of reference talkers $S_i$, $1 \leq i \leq N$, is used to represent the actual talker population, which is unlimited. Explicitly modeling the open speaker population in this way greatly improves performance of speaker verification.

BRIEF DESCRIPTION OF DRAWINGS

The above objects and further features and advantages of the invention are described in detail below in conjunction with the drawings, of which.

DETAILED DESCRIPTION OF PREFERRED EMBODIMENTS

The various features, advantages, and improvements of the invention are used in speaker recognition systems. Such systems are well known in the industry as generally having a front-end speech digitizer for digitizing audio speech input into a series of frames of digital data at a given sampling rate representing the input speech. The speech frames are analyzed by a speaker recognition module which compares the incoming speech input to reference set of speech features of different speakers obtained during prior training sessions. The speaker recognition module scores the closeness of matches between the input speech and the corresponding reference sets of different speakers the system has been trained to recognize. A decision is then made as to which speaker provides the closest match, and the input speech is then identified as belong to that speaker. In message sorting systems, input speech messages are placed in a queue and the messages are sorted using the speaker recognition module for speaker identification. In speaker spotting systems, input speech conversations of two or more speakers on a channel, such as a telephone line, are placed in a queue and the speech segments of the different speakers are identified using the speaker recognition module.

In the present invention, improvements to the baseline algorithm used in a conventional speaker recognition module are provided to enhance speaker recognition performance. A nonparametric approach to speaker recognition is used in the present invention, and the specific embodiments described below relate particularly to enhancement of the baseline algorithm in a message sorting system for speech transmitted on a telephone channel.

Figure 1:
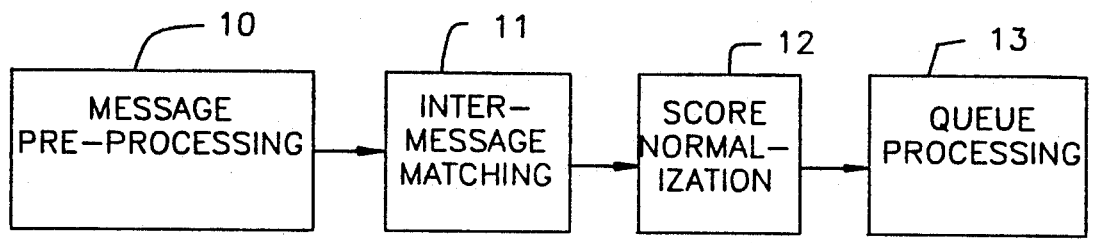
FIG. 1 is a block diagram of the basic steps of the non-parametric speaker sorting baseline algorithm in accordance with the invention.

FIG. 1 is a block diagram of the baseline algorithm showing the processing steps of message preprocessing, intermessage matching, score normalization, and queue processing. The excellent performance of the baseline algorithm is attributable to several key properties. The speech features used have been found to be robust in many applications. Frames corrupted by noise and clipping are largely eliminated. Blind deconvolution is used to remove the effects of linear channel variability. The computed match distances are found to be highly correlated with log likelihood ratios. Further, the score normalization removes the residual biases and unknown scale factors of the match distances and unconditional message probabilities, as necessary for accurate sorting. The manner in which these and other properties of the baseline algorithm are obtained is discussed in the following description.

Message Pre-Processing

Figure 2:
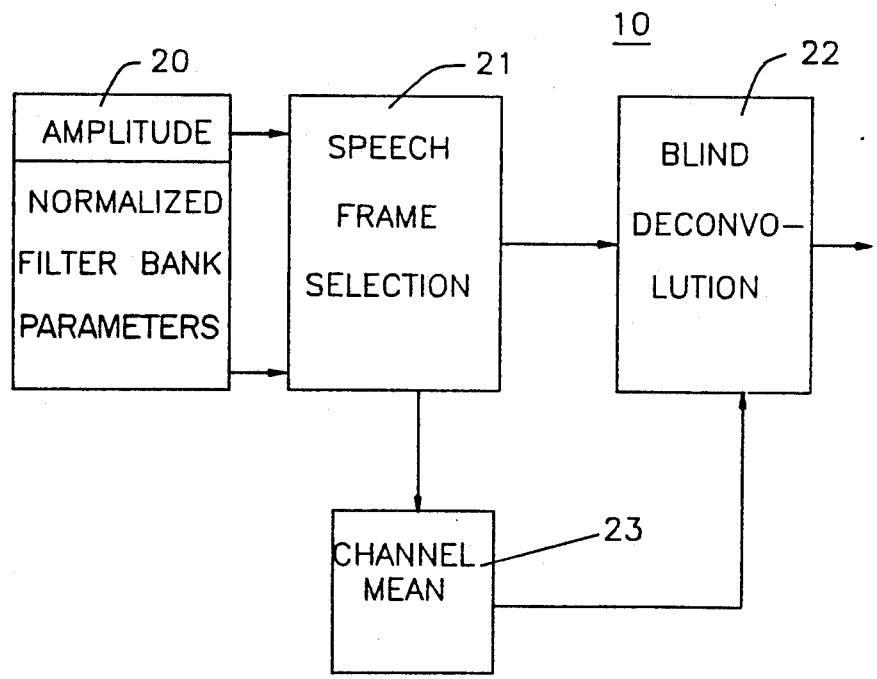
FIG. 2 is a block diagram of the message preprocessing portion of the baseline algorithm.

FIG. 2 is a block diagram of the message preprocessing portion of the baseline algorithm. The main functions are feature extraction, where frame amplitude and filterbank parameters are derived from the incoming speech signal, frame selection, and blind deconvolution. Each of the main functions is described below.

In feature extraction, the speech signal is sampled M times per second and converted to a 16-bit linear digital representation. This sampled data is processed by performing a 256-point DFT every twenty milliseconds (96 point overlap). A Hamming window is used, without pre-emphasis. Fourteen spectral channels are extracted from this analysis by forming weighted sums of individual DFT spectral power values. The fourteen channels span approximately 300 to 3500 Hertz and are constant bandwidth up to approximately 1000 Hertz, and constant Q thereafter. Each channel has very sharp cutoff (sharper at the upper boundary than at the lower), and crossover is at about the two dB point. Channel weighting is such that white noise input causes equal output in each channel. The frame power is computed, by summing the power in all DFT channels and converting the result to dB.

The spectral channel representation is normalized by first taking the fourth root of each channel power, and $l_2$-normalizing the fourteen component vector of spectral values. The fourth root used in these parameters was suggested by studies of the perception of loudness, and is very similer to a logarithmic transformation over the dynamic range of interest. The channel bandwidths and placements roughly correspond to equal intervals on the the mel scale of frequencies. These parameters are used in many applications of speech and speaker recognition, and are generally found to be robust with respect to noise degradation. They are not considered optimal for speaker spotting, and it is expected that the algorithm can be improved considerably by using better parameters.

In frame selection, three criteria are imposed to limit the set of frames on which the algorithm operates. First, frames of very low power are eliminated, in order to consider only that portion of the data sum that may contain speech. A histogram of power is then formed using all remaining frames in the message. A nominal interval of acceptable energies is established as the range from the tenth percentile value plus six dB to the 97th percentile minus three dB. If that nominal range is six dB wide or wider, only those frames with energies within it are used. Otherwise, the passing range is widened to six dB symmetrically about the center of the nominal passing energy range. This guarantees that the algorithm will see at least six dB of dynamic range in the speech data, but eliminates regions of probable degradation due to extreme clipping and/or noise, if sufficient dynamic range is present in the original data.

In blind deconvolution, channel effects are then minimized by deconvolving the spectral data to a white spectrum. This is done by multiplying the values in each filterbank channel by a value chosen to make the mean over selected frames equal to a constant. Finally, the fourteen filterbank values are renormalized using the $l_2$ norm. Both reference speech data for target talkers and unknown speech to be classified are subjected to the processing described above, one message at a time.

Inter-Message Matching

In message match scoring, the Euclidean squared metric is often used heuristically, without very serious consideration. For example, classical textbooks on pattern recognition rationalize it for nearest neighbor classification procedures by showing a relationship between the Parzen estimate of local probability density and nearest neighbor distance. It is shown that nearest neighbor classification is equivalent to estimating the local density of each pattern class by a Parzen estimate and assigning the unknown to the class with the largest local density, as is required for a Bayesian decision (in the case of equal priors and equal costs) Generalizing to the case where many observations (assumed independent) are to be combined to reach a decision, the paradigm would be to estimate the likelihood ratio in terms of distances and accumulate those estimates. Again following the textbooks, the Parzen estimate of the local density of a reference class at the observation point of the unknown is:

$$p_R = \frac{1}{V_n(d_{NN})}.$$

where $V_n(x)$ is the volume of a sphere of radius x in the n-dimensional parameter space, and $d_{NN}$ is the distance from the observation to its nearest neighbor in the reference class. Since $V_n(x)$ is proportional to $x^n$, that implies that to accumulate log likelihood ratios we should accumulate values proportional to:

$$-\log(p_R) = n \log(d_{NN})$$

whereas in fact we are accumulating (in the averaging process) values proportional to $d_{NN}^2$. The reason for this is that the square of the nearest neighbor distance correlates better with the logarithm of the local density than does the logarithm of that distance, as the Parzen estimate would seen to indicate. This is somewhat surprising in view of the robustness and desirable properties of the Parzen estimate touted by some authors. It is easy to show, however, that in a parameter space of more than about five dimensions, an absolutely enormous reference set is necessary in order for the Parzen estimate to be a reasonable one.

In the present system, the parameter space has thirteen dimensions and the reference data consists of at most several thousand frames per message. Under these conditions, in populations which can be approximated as a roughly disjoint union of multi-variate whitened Gaussians with similar variances, the square of the nearest neighbor distance not only correlates well with the logarithm of the local density, but the two are also approximately related by the affine transformation:

$$-\log(p_R(u)) = a + bd_{NN}^2$$

for some constants a and b. As the additive constant a disappears when log densities are subtracted to form log likelihood ratios, leaving 12 as a simple scale factor, it follows that the square of nearest neighbor distances is the appropriate value to accumulate to approximate likelihood ratio scoring. The whitening of the Olano parameters mentioned above (whereby the variances in each parameter space dimension are made equal) helps make this approximation reliable. Recognizing this as the basis for accumulating the square of the nearest neighbor distances, the following relations are given:

$$d_u^R \approx -\log(p_R(u)) = -\log(p(u|R)) = -\log\left(\frac{p(u,R)}{p(R)}\right)$$

$$d_r^U \approx -\log(p_U(r)) = -\log(p(r|U)) = -\log\left(\frac{p(r,U)}{p(U)}\right)$$

where $p_R(u)$ is the probability density of the reference message at u, $p_U(r)$ is the probability density of the unknown message at r, and the approximation now includes the affine shift and scale effects of a and b.

If frames were independent events, or if all messages were of the same length, it would be appropriate to accumulate, rather than average, the $d_{u,R}$ and $d_{r,U}$ to form the Score values, as that would be equivalent to accumulating log likelihood ratios. Instead, the average is used because it normalizes the message length and reduces sensitivity to the lack of independence between frames. The Score values are thus appoximations of logarithms of conditional probabilities:

$$Score_A = \underset{u \in U}{ave}[-\log(p_R(u))] \approx -\log(p(U|R)) = -\log\left(\frac{p(U,R)}{p(R)}\right)$$

$$Score_B = \underset{r \in R}{ave}[-\log(p_U(r))] \approx -\log(p(R|U)) = -\log\left(\frac{p(U,R)}{p(U)}\right)$$

where p(U,R) is thought of as the probability that unknown message U and reference message R were spoken by the same talker. In view of the approximate affine relationship of the Score values to the conditional probabilities exhibited above, summing them produces:

$$Score_A + Score_B \approx a' + \beta' \log\left(\frac{p(U,R)^2}{p(R)p(U)}\right)$$

where a' and b' are related to a and b in an obvious way. This is the meaning of the match scores before they are modified by score normalization.

Figure 3:
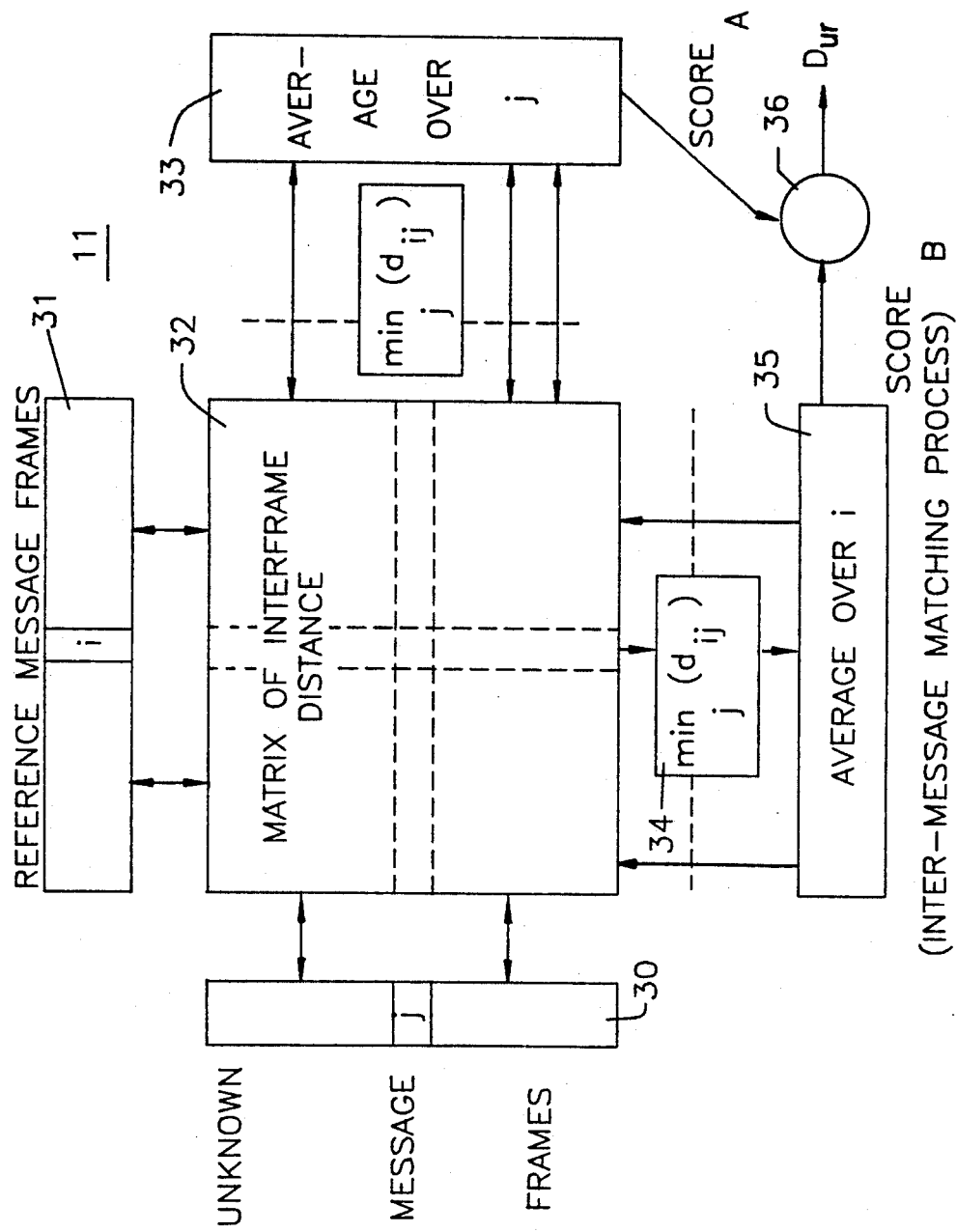
FIG. 3 is a schematic diagram illustrating the message matching and scoring process.

FIG. 3 is a schematic diagram illustrating the message matching and scoring process. Match scores are computed for a combination of unknown and reference messages in two steps. Only the frames selected as described above are considered. First, each frame of the unknown is compared to every frame of the reference message and given a score equal to the minimum Euclidean squared distance between the unknown and all reference frames. $Score_A$ is set equal to the average of these values over all frames of the unknown message.

Next, the same process is repeated, but comparing each frame of the reference to all frames of the unknown, to form $Score_B$. The match score assigned to the comparison of this combination of unknown and reference messages is then the sum of $Score_A$ and $Score_B$. Stated mathematically, this process is summarized as follows. If we let $u_j$ be the j-th frame of unknown message U and $r_i$ be the i-th frame of reference message R, the "distance" from $u_j$ to the reference message is:

$$d_{j,R} = \min_{i}[|u_j - r_i|^2]$$

and the "distance" from $r_i$ to the unknown message U is:

$$d_{i,U} = \min_{j}[|u_j - r_j|^2]$$

The resulting scores are:

$$Score_A = \underset{j}{ave}[d_{j,R}]$$

$$Score_B = \underset{i}{ave}[d_{i,U}]$$

The remaining processing operates on scores found by "matching" the messages in the message queue against a set of reference messages. The reference message set consists of training data for target speakers. In experiments conducted, the reference message set included three 30-second messages from each of 25 target talkers.

It is clear that scores computed as described above are rich in speaker dependent information when the underlying speech feature distributions are themselves speaker-dependent. The presence of P(R) and P(U) in the expression above also indicates that proper interpretation and use of the scores has to take into consideration speaker a priori probabilities and unconditional message probabilities, which justifies the need for further normalization.

Score Normalization

The speaker scoring algorithm incorporates three especially important normalization procedures: scoring relative to a representative set of talkers; normalizations with respect to unconditional message probability; and removal of biases due to inference data variability. All three are believed important in obtaining scores which are meaningful across both talkers and messages, which is crucial for both reliable assignment of threshold values in terms of ROC performance curves and for accurate message sorting. The first two normalizations are obtained using reference data for a representative set of talkers, which may often include data for non-target speakers. The third normalization is achieved by using z scores.

Figure 4:
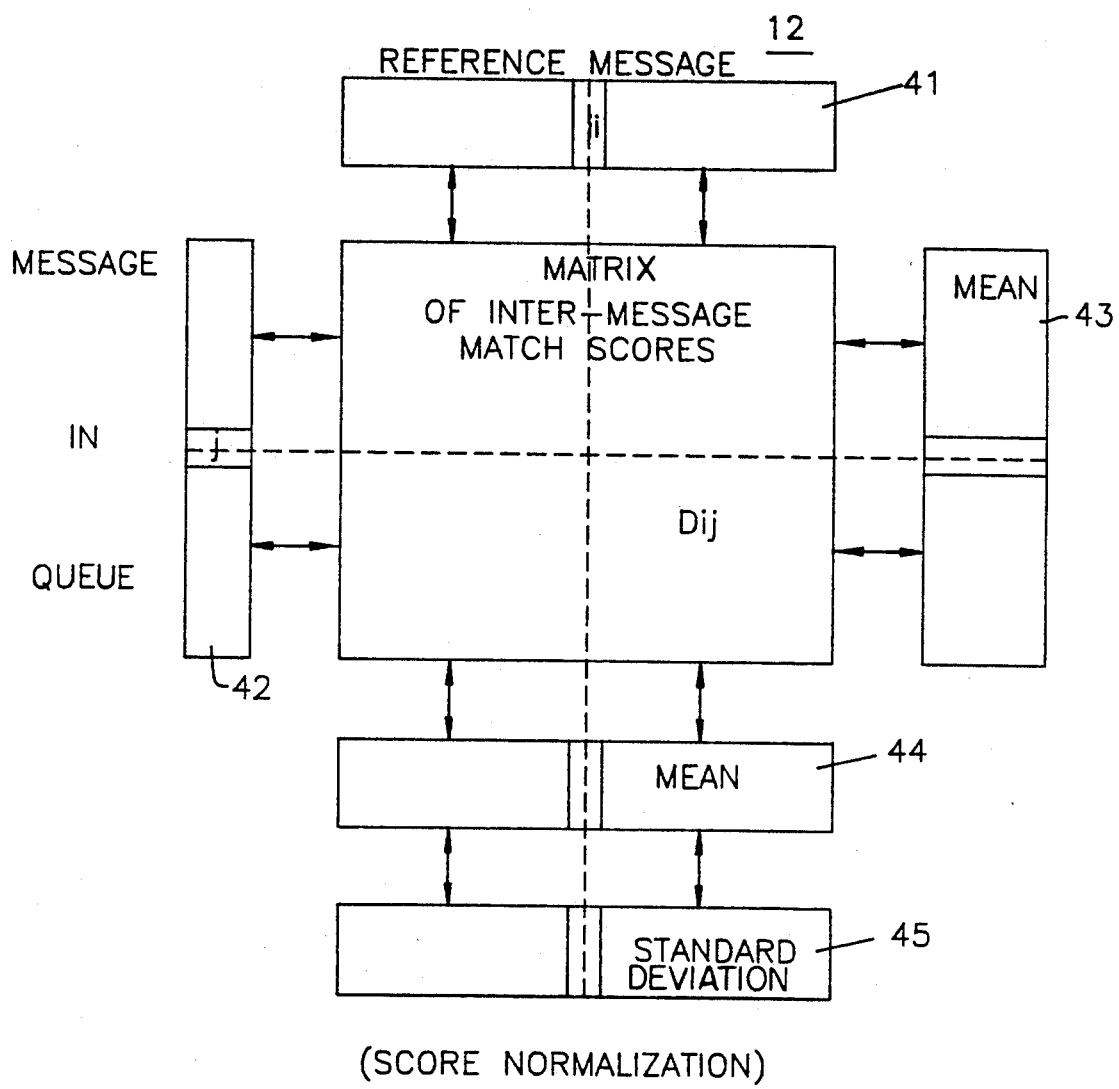
FIG. 4 is a schematic diagram illustrating the score normalization process.

Referring to FIG. 4, normalization of raw message-to-message match scores with respect to an entire set of reference talkers, which is accomplished by forcing the rows of the raw score matrix to zero, normalizes scores with respect to the unconditional probability of the message. An atypical queued message will be characterized by unusually large raw scores against all reference messages, i.e., all across its row of raw scores, and typical messages will have smaller raw scores on the average. Rational comparison of one message's likelihood of having been spoken by a target talker to that of another message thus requires such a normalization, and it is done by de-meaning each row. It is critical, however, that this normalization be done with respect to a large enough sample of reference talkers to avoid accidentally destroying information in the raw scores.

Use of the negative z score, which normalizes scores with inspect to the variance of scores over the message queue, takes into account the observed fact that reference messages usually have an inherent bias which manifests itself as a propensity toward larger or smaller score values against all messages, whether by the same talker or not. Rationalization of the z score can be understood in terms of likelihood ratios as follows. Raw scores (before row, or reference message, normalization) are non-negative measures of dissimilarity between the reference message and the unknown message. The conditional probability densities of this measure, given that reference and unknown were spoken by the same or different talkers, characteristically rise smoothly from zero to a single mode and fall smoothly to zero. The central tendency of the same-talker case is much smaller than that of the different-talker case, i.e., the same talker scores tend to be much smaller than the different-talker case. As a result the log likelihood ratio falls monotonically from a high positive value at the left through zero to very negative values at large score values. Approximating this behavior with a straight line shows that it is like the negative z score of the different-talker probability density, up to an additive constant. The biases inherent in reference messages manifest themselves in these densities primarily as a change in scale, affecting the same-talker and different-talker distributions in essentially the same way. The z score of the different-talker probability density is invariant with respect to such scale differences. Therefore, using it as an approximation to the likelihood function automatically removes any effect of the reference message scale bias. In implementation, it is assumed that the same-talker case arises rarely so the mean and variance of the scores for a given reference message are essentially those for the different-talker case, and can safely be used to compute the negative z scores.

The rationalization given above uses many approximations and assumptions. However, the excellent performance of this baseline algorithm in sorting queues strongly indicates that the normalizations used are successful in producing scores monotonically related to negative logarithms of the Bayes ratio (the probability of the queued message given that it was spoken by the hypothesized talker, divided by the unconditional probability of the queued message), at least for the range of compositions of queues used in the tests. At present this scoring computation appears to be justified primarily on the basis of its success in speaker spotting.

In implementation, match scores are computed for each message in the queue against each reference message, as shown in FIG. 4. Treating this set of match scores as a matrix, one column per reference message and one row per message in the queue, the scores are first normalized across rows by subtracting the constant for each row which reduces its mean to zero. This is the very important normalization of the scores with respect to target and reference talkers. Scores are then normalized within columns, by replacing each with its negative z score relative to the column mean and variance.

These two normalizations can be expressed mathematically as follows. Let the original scores in the (Message queue)x(Reference messages) matrix be denoted $d_{m,r}$. Then:

$$d_{m,r} = \text{Score}_A(U_m, R_r) + \text{Score}_B(U_m, R_r)$$

The result of normalization with respect to the reference set is replacement of $d_{m,r}$ by $d'_{m,r}$, where $$d'_{m,r} = d_{m,r} - \frac{1}{|R|} \sum_{r=1}^{|R|} d_{m,r'}$$

and the final score for each message in the queue and each reference message is:

$$d''_{m,r} = -\frac{d'_{m,r} - <d'_{m,r}>_m}{\sqrt{var_m(d'_{m,r})}}$$

where $<d'_{m,r}>_m$ is the mean of the score column for reference message r and $var_m(d'_{m,r})$ is the variance of the scores in that column.

Queue Processing

Queues are sorted on the basis of a set of z scores for each message in the queue and each target talker. Each target talker is given a match score against each message in the queue equal to the average of all normalized match scores for his reference data against that message. (It is common to represent a target talker by all, or at least several, reference messages taken from his training data.) This produces a matrix of scores of each queue message against each target talker.

Queues are then sorted as follows. For a single target talker, the queue is ordered on descending values of the (single) final score value, larger scores indicating greater posterior probability of the talker. When the target talker set contains more than one talker, each queue message is given a target set score by treating the message/talker scores as proportional to the logarithm of the Bayes ratio, i.e., the conditional probability of the unknown message, given the talker, divided by the unconditional probability of the message. The score given to each message for the whole target talker set is then:

$$S_m = \sum_{t \in T} e^{S_{m,t}} p_t,$$

where T is the set of target talkers, $S_{m,t}$ is the message/talker score for message a and talker t, and $p_t$ is the a priori probability that talker t is in the queue. The queue is sorted on descending values of this sum, with larger values indicating greater likelihood that a message is from one of the target talkers.

Baseline Algorithm Performance

The performance of the baseline algorithm for message sorting was tested using a control database (referred to as the King database). The King database consisted of recordings of 50 male speakers engaged in speech-elicitation tasks designed to simulate ordinary telephone conversations. Each speaker had ten sessions of roughly 40 seconds duration. A telephone "loopback" arrangement was used, wherein subjects placed calls through a long-distance carrier to a separate telephone line at their same location. In this way, simultaneous recordings were made of the direct signal using a high-quality microphone and of the signal received at the "far end" of the telephone line.

Because speaker sorting is an "open set" problem, a set of non-target speakers who are not used to train the algorithm were set aside for testing. The database was divided into 25 even-numbered speakers, used as targets, and 25 odd-numbered speakers, used as non-targets. The simulated message-queue was composed of one message from each of the 50 talkers. The reference set was composed of all the training messages for the target talkers. Histograms of scores were generated for targets and non-targets. These, in turn, were used to generate ROC curves which measure performance obtained using the same threshold for every target.

Figure 5:
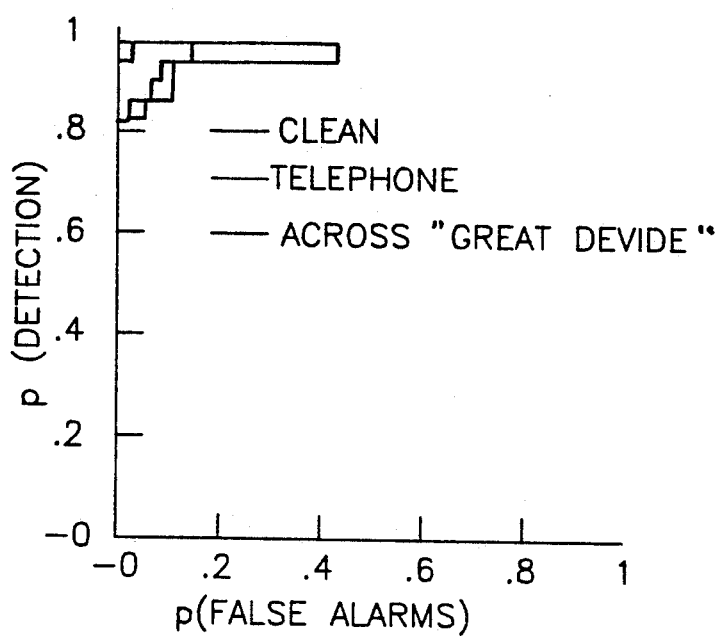
FIG. 5 is a diagram illustrating the baseline algorithm performance for representative telephone data sets.

FIG. 5 shows measured ROC curves for three conditions: the curve marked "Clean" represents training and testing of the clean, or wideband, database; the curve marked "Telephone" represents training and testing of the telephone, or narrow band, database; and the curve marked "Across the Great Divide" represents training and testing on a telephone database including differences between first and last sessions probably caused by changes in the recording equipment.

These results show some of the best performance that have been reported on the King database. At a detection rate of 80%, no false alarms were observed when using clean speech, or when training and testing on the same side of the "great divide". When testing across the "great divide", the false alarm rate was 0.8%.

Table I below presents performance of the baseline algorithm on closed-set speaker identification. The test was restricted to the first 16 talkers of the King database for comparability with recent published results on the same telephone data. The performance measures given are the average rank of the true speaker and the percentage correct identification accuracy. These measures are shown for both "raw" scores, without applying the score normalization process, and normalized scores.

TABLE I

| | Baseline Algorithm Closed-Set Performance | | | |
|---|---|---|---|---|
| Train | Test | Score Norm. | Average Rank | Percent Correct |
| 1, 2, 3 | 4, 5 | No | 1.03 | 97 |
| 1, 2, 3 | 9, 10 | No | 1.41 | 66 |
| 1, 2, 3 | 4, 5 | Yes | 1.0 | 100 |
| 1, 2, 3 | 9, 10 | Yes | 1.0 | 100 |

The excellent performance of the baseline algorithm is obtained at the cost of a large computational burden. However, it is feasible to implement this algorithm using available processors. For estimation purposes, all the computation may be attributed to the inter-message matching process. In the worst case, this process compares all frames of all messages in the queue with all frames of all the reference messages. If both the message queue and the reference set contain 75 messages of 2000 frames (40 seconds) each, then $(2000 \times 75)^2$, or $2 \times 10^{10}$ distance measures, or roughly $5 \times 10^{11}$ operations are required. These computations are done using fixed-point arithmetic, representing parameter values with 8 bits precision. Squares may be found using lookup tables. To process the 50-minute queue in 50 minutes would require computation at a rate of about 160 MIPS. In fact, the actual required computation is much less than this because the speech frame selection step eliminates many of the frames (e.g., about 80% of the frames in the King telephone database) from entering the computation. In addition, the computation consists of massive repetition of simple operations, which is ideal for implementation using parallel processing.

Sorting Based on Complex Sorting Keys

A union event occurs when any of a specified set of talkers engages in conversation. An intersection event occurs when two specified talkers both engage in the same conversation. For the split channel case, the definition of an intersection requires that there be an external indication that two messages belong to the same conversation.

The probability of a union event should be the sum of the individual probabilities of the talkers in the set. Given that only one or at most two of them can actually be engaged in the conversation, the sum reduces to the best talker's probability, or the sum of the two best talker's probabilities. To a first approximation, the score for the union event is taken as the best score for any talker in the union set.

The probability of an intersection event should be the product of the individual probabilities of the two talkers, assuming the activity of the talkers is independent, Since the scores of the baseline algorithm correspond to logarithmic probabilities, the score for the intersection event is computed as the sum of these scores for the talkers comprising the event.

The Co-Channel Problem

The co-channel regime is characterized by an input audio signal which is a two-sided conversation without external indication of which segments of speech are generated by either talker alone or by both talkers simultaneously. To correct for this, the algorithm designed for the co-channel problem can model the timing patterns of telephone conversations between two speakers. One fairly simple extension of the baseline algorithm demonstrates the feasibility of sorting on co-channel signals. The method relies on models that explicitly allow for the presence of two talkers inter-mixed. During each short period of speech (200 ms), assumed to be purely a single talker, a score, $R_i$, for every reference talker i is accumulated. At the end of each 200 ms period, all joint hypotheses, $M_{ij}$, are updated by accumulating the better score, min $(R_i, R_j)$, from the two talkers, i and j, represented in that specific joint hypothesis. All mixed hypotheses are accumulated from throughout the whole conversation. After accumulation in the space of logarithmic probabilities, the hypothesis likelihoods are exponentiated back into a scaled probability space.

Scores for joint and single talker hypotheses are simple applications of Bayes rules. If a certain pair of speakers, a and b, was the target event, then that specific joint hypothesis $M_{ab}$, normalized by the probability of all joint hypotheses, SUM $M_{ij}$, would be an appropriate probability measure with which to score that pair.

$$S_{ab} = \frac{M_{ab}}{\frac{1}{N^2} \sum_i \sum_j M_{ij}}$$

If the sorting key is a single target talker, t, all messages are examined where t talks with any unspecified other talker. The unspecified talker is assumed to be represented among the reference talkers, with uniform probability 1/N, where N is the number of reference talkers. The score for talker t is the average of all joint scorns in which he participates.

$$S_t = \frac{1}{N} \sum_u S_{tN}$$

To visualize, when the target talker speaks, the matrix of joint hypothesis likelihoods shows a good row and column intersecting on that target talker. When an unmodeled talker speaks, the matrix of likelihoods is relatively flat. Summing across the row or column correponding to the target talker tends to give a better score when the target is speaking.

Figure 6:
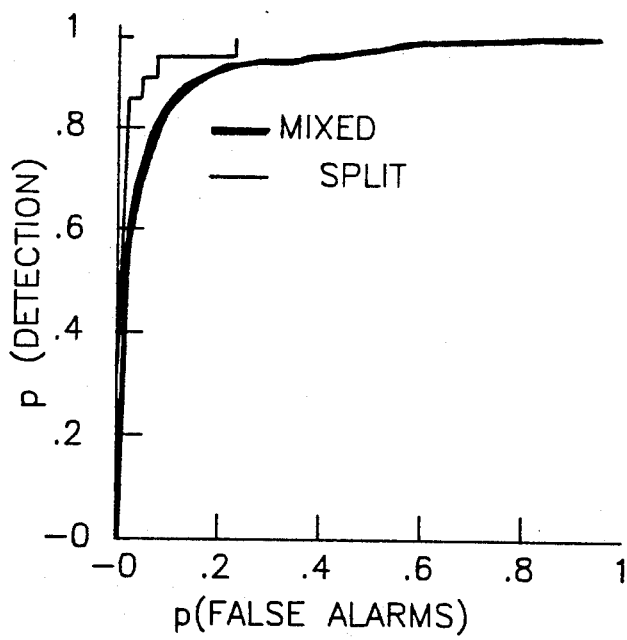
FIG. 6 is a diagram illustrating the algorithm performance for simulated co-channel telephone data.

FIG. 6 shows the measured performance for single-talker sorting keys on simulated co-channel data using a version of the recognition algorithm, compared with the split-channel whole-session performance using the same algorithm. Under these benign testing conditions, the simulated co-channel data gives 6% probability of false alarm at 80% probability of detection.

I claim:

1. In a method of automatically recognizing a speaker on a communication channel, including the steps of digitizing input speech signals into a series of frames of digital data representing the input speech, analyzing the speech frames by a speaker recognition module which compares the incoming speech to a reference set of speech features of a given group of different speakers obtained during prior training sessions and generates respective match score therefrom, and determining which speaker the input speech is identified with based upon the match scores with each speaker associated with at least one stored reference frame, in combination therewith, the improvement wherein:

said analysis of speech frames by said speaker recognition module is implemented through the use of a set of speech feature vectors to characterize a given speaker's speech patterns, said speech feature vectors being non-parametric in nature and said comparison of incoming speech to reference speech features by said speaker recognition module includes generating a match score which is a sum of a $Score_A$ set equal to the average of the minimum Euclidean squared distance between the unknown speech frame and all reference frames of a given speaker over all frames of the unknown input, and $Score_B$ set equal to the average of the minimum Euclidean squared distance between each frame of the reference set to all frames of the unknown input, over all frames of the reference set of speech features, wherein the "distance" from $u_j$ to the reference message R is:

$$d_{j,R} = \min_i [|u_j - r_i|^2]$$

and the "distance" from $r_i$ to the unknown message U is:

$$d_{i,U} = \min_j [|u_j - r_j|^2]$$

wherein $u_j$ is the j-th frame of unknown message U and $r_i$ be the i-th frame of reference message R, and $$Score_A = \operatorname*{ave}_j [d_{j,R}]$$

$$Score_B = \operatorname*{ave}_i [d_{i,U}]$$

and wherein said comparison of incoming speech to reference speech features includes a step of normalizing said match score with respect to said stored reference frame for all speakers to provide a normalized score and comparing all normalized scores for all speakers to select the speaker having a highest acceptable normalized score.

2. A method of speaker recognition according to claim 1, further including the step of normalizing the match scores relative to the reference group of speakers.

3. A method of speaker recognition according to claim 1, further including the step of removing the effects of variations in reference message content by using the z score to remove the means and fix the variance of an unknown queue of match distances to each reference message.

4. A method of speaker recognition according to claim 1, further including the step of controlling the sensitivity of the speaker recognition model by selecting speech frames for inclusion or exclusion depending upon the expected speech information contained therein.

5. A method of speaker recognition according to claim 1, further including the step of normalizing the frames of input speech to remove the mean channel spectrum observed within the message, by the process known as blind deconvolution.

6. A method of speaker recognition according to claim 1, further including the step of determining a speaker speaking in a conversation of a number of speakers by using a union of reference sets for pairs of talkers as the reference set for a co-channel signal.

7. A method of message sorting according to claim 1, further including the step of using a non-parametric comparison of input speech messages to the reference set for the given group of speakers, wherein the reference set characterizes a given speaker's speech patterns by a non-parametric set of speech feature vectors.

8. In a method of automatically sorting voice messages transmitted on a communication channel, including the steps of placing input speech messages in a queue, digitizing the input speech messages into a series of frames of digital data representing the input speech messages, analyzing the speech frames by a speaker recognition module which compares each incoming speech message to a reference set of speech features of a given group of different speakers obtained during prior training sessions and generates respective match score therefrom with each speaker associated with at least one stored reference frame, and determining which speaker the input speech message is identified with based upon the match scores, in combination therewith, the improvement wherein:

said analysis of speech frames by said speaker recognition module is implemented through the use of a set of speech feature vectors to characterize a given speaker's speech patterns, said speech feature vectors being non-parametric in nature and said comparison of incoming speech to reference speech features by said speaker recognition module includes generating a match score which is a sum of a Score$_A$ set equal to the average of the minimum Euclidean squared distance between the unknown speech frame and all reference frames of a given speaker over all frames of the unknown input, and Score$_B$ set equal to the average of the minimum Euclidean squared distance between each frame of the reference set to all frames of the unknown input, over all frames of the reference set of speech features, wherein the "distance" from $u_j$ to the reference message R is:

$$d_{j,R} = \min_{i}[|u_j - r_i|^2]$$

and the "distance" from $r_i$ to the unknown message U is:

$$d_{i,U} = \min_{j}[|u_j - r_j|^2]$$

wherein $u_j$ is the j-th frame of unknown message U and $r_i$ be the i-th frame of reference message R, and and wherein said comparison of incoming speech to reference speech features includes a step of normalizing said match score with respect to said stored reference frame for all speakers to provide a normalized score and comparing all normalized scores for all speakers to select the speaker having a highest acceptable normalized score.

* * * * *